United States Patent [19]

Solie et al.

[11] 4,396,186
[45] Aug. 2, 1983

[54] ADJUSTABLE WORK SUPPORT

[75] Inventors: James C. Solie; Larry D. Allard, both of Owatonna, Minn.

[73] Assignee: Owatonna Tool Company, Owatonna, Minn.

[21] Appl. No.: 277,221

[22] Filed: Jun. 25, 1981

[51] Int. Cl.³ .............................................. B23Q 3/02
[52] U.S. Cl. .................................................... 269/310
[58] Field of Search ....................... 269/20, 27, 30, 32, 269/309, 310, 296; 188/67, 129; 92/5 R, 23, 60

[56] References Cited

U.S. PATENT DOCUMENTS

| | | | |
|---|---|---|---|
| 2,984,212 | 5/1961 | Hicks et al. | 121/40 |
| 3,421,750 | 1/1969 | Tridgell | 269/20 |
| 3,559,980 | 2/1971 | Terai | 269/20 |
| 3,729,185 | 4/1973 | Roeske | 269/20 |
| 3,792,855 | 2/1974 | Bondie | 269/310 |
| 3,883,153 | 5/1975 | Singh et al. | 280/124 R |
| 3,938,798 | 2/1976 | Solie et al. | 269/20 |
| 3,998,444 | 12/1976 | Stockwell | 269/20 |
| 4,196,896 | 4/1980 | Burns | 269/20 |

FOREIGN PATENT DOCUMENTS 2338903  2/1974  Fed. Rep. of Germany ...... 269/310

Primary Examiner—Robert C. Watson
Attorney, Agent, or Firm—Wood, Dalton, Phillips, Mason & Rowe

[57]  ABSTRACT

An adjustable work support for relatively light loading having an extendable plunger locked in position by a fluid-operated piston which acts on a disc positioned between the rod of the piston and the plunger and which is urged to a position to take up clearance to avoid shift of the disc and resulting inadvertent retraction movement of the plunger. A sealed cavity with a flexible bladder communicates with a piston chamber housing the piston and a closed end of the bore mounting the plunger whereby flow of fluid to the sealed cavity avoids any ram effect on the plunger when the piston is operated to lock the plunger in position.

6 Claims, 2 Drawing Figures

ADJUSTABLE WORK SUPPORT

BACKGROUND OF THE INVENTION

This invention pertains to an adjustable work support usable with relatively light loads and which can be operated without deflecting relatively lightweight material which is being supported and accurately held in position.

An adjustable work support for relatively heavy loads is shown in Solie et al U.S. Pat. No. 3,938,798 wherein a plunger is mounted for extension from a casing and is locked in position by movement of a fluid-operated piston which engages a driving pin associated with a number of pins surrounding the plunger whereby compressive force on the driving pin provides frictional forces locking the plunger in position. It is possible in a work support for lighter loads to obtain an air ram effect upon pressurization of the piston whereby air trapped within the unit causes an upward force to be exerted upon the plunger. When supporting a relatively thick, stiff workpiece, this effect is not significant and will be adequately resisted by the workpiece without any deflection thereof. However, such effect could result in deflection of a relatively light metal workpiece.

SUMMARY OF THE INVENTION

A primary feature of the invention disclosed herein is to provide an adjustable work support for relatively light loads which accurately supports a workpiece, avoids harmful deflections in the workpiece, and provides an indication of malfunction.

An object of the invention is to provide an adjustable work support having a casing with a bore having an open end and a closed end with a plunger movable lengthwise in the bore and extendable fom the open end thereof for engagement with a workpiece to be supported, a piston in a piston chamber operable to hold the plunger in a predetermined extended position, and a cavity in the casing having a flexible bladder mounted therein for movement to permit variation in the size of a fluid storage section of the cavity and said fluid storage section communicating with the piston chamber and a closed end of the bore whereby fluid can flow between the piston chamber and the closed end of the bore and said fluid storage section whereby an air ram effect on the underside of the plunger upon actuation of the piston is avoided.

The fluid storage section can also receive hydraulic fluid leaking past the piston and the flexible bladder moves to a leak-indicating position when the fluid storage section is substantially filled with hydraulic fluid.

Still another object of the invention is to provide an adjustable work support as defined in the preceding paragraphs wherein a floating disc is positioned between the piston and the plunger and is urged against the plunger when the piston is pressurized to frictionally hold the plunger in position and said disc is continuously urged toward the closed end of the bore to take up clearance in order to limit downward movement of the plunger which could otherwise occur because of the clearance.

DESCRIPTION OF THE PREFERRED EMBODIMENT

Figure 1:
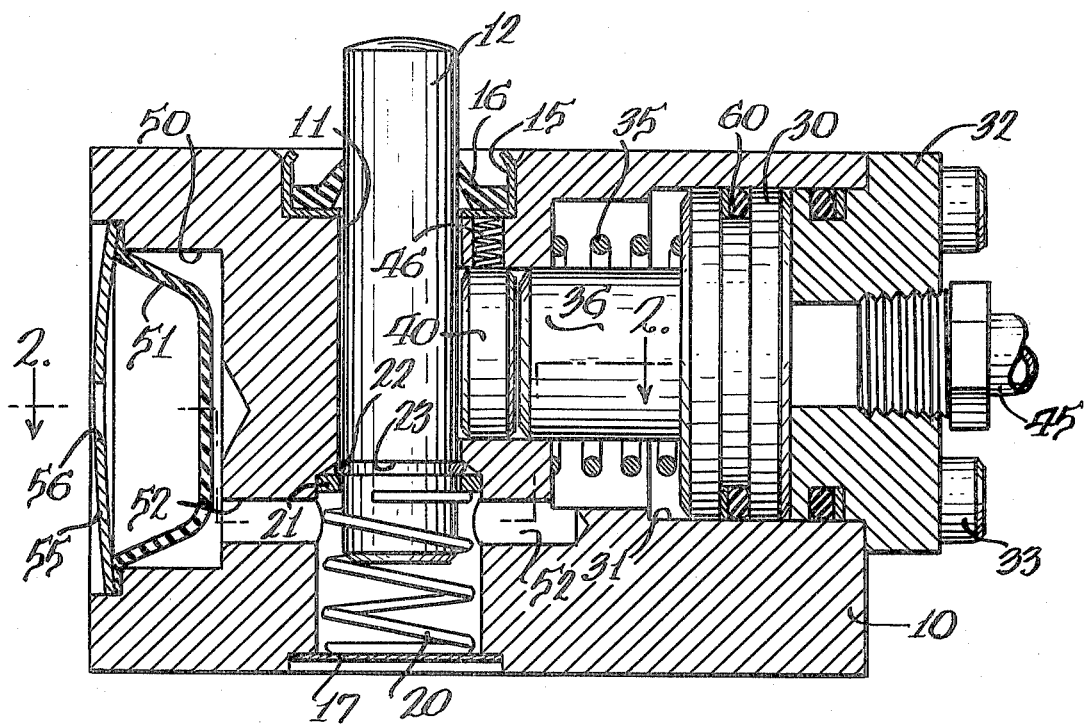
FIG. 1 is a vertical section, taken centrally through the adjustable work support.
Figure 2:
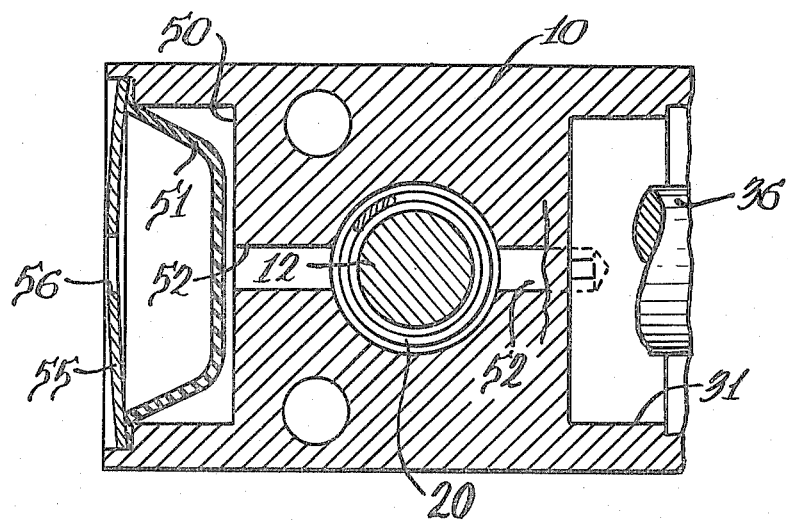
FIG. 2 is a plan section, taken generally along the line 2—2 in FIG. 1 with a force-transmitting disc omitted.

The adjustable work support has a casing 10 with a cylindrical bore 11 extending therethrough. A plunger 12 is movably mounted within the bore and extends out through the open end thereof for supporting engagement with a workpiece. The open end of the bore is closed by a concave cap 15 fitted within a recess in the casing and which mounts a flexible seal member 16 in surrounding engagement with the plunger.

The opposite end of the bore is closed off by a circular cover member 17 secured within a recess in the casing. The plunger 12 is urged outwardly of the casing by a spring 20 acting between the cover member 17 and an annular washer 21 held in fixed relation to the lower end of the plunger by a ring member 22 positioned within a groove 23 in the plunger.

The spring 20 yieldably urges the plunger 12 outwardly of the casing into supporting relation with a workpiece. The plunger is held in this position by a fluid-operated piston 30 positioned within a piston chamber 31 formed in the casing 10 and which is sealed by a cover member 32 secured to the casing by threaded members 33. The piston is urged to an inactive, retracted position by a spring 35 surrounding a piston rod 36 extending from one side of the piston 30. A circular disc 40 is movably positioned at an end of the piston chamber between an end of the piston rod 36 and the plunger 12. The opposite end of the piston chamber can be supplied with hydraulic fluid under pressure through a passage 45 in the cover member 32 and, when such occurs, the piston 30 and the piston rod 36 are urged toward the left, as viewed in FIG. 1, to shift the disc 40 into firm frictional engagement with the plunger 12 to hold the plunger in a predetermined position. The piston rod 36 and disc 40 are mounted with clearance within a reduced diameter part of the piston chamber and, therefore, the disc 40 is urged toward the closed end of the bore 11 by a spring 46 fitted within a bore in the casing and held in position by the concave cap 15. This takes up the clearance between the disc 40 and the reduced diameter portion of the piston chamber whereby the required clearance does not permit downward movement of the disc and the plunger 12 when the plunger is under load.

A cavity 50 opening to one end of the casing has a flexible bladder 51 mounted therein to permit variation in the size of a fluid storage section of the cavity which communicates with the piston chamber 31 and the lower closed end of the bore 11. This communication is by means of a passage 52 extending centrally of the casing from the piston chamber to the cavity and intersecting with the lower end of the bore 11. The flexible bladder 51 is suitably formed of a material, such as neoprene, and is held in position by a concave circular plate 55 which is pressed into an undercut surrounding the cavity 50 and then deformed sufficiently to firmly seat with the casing. An opening 56 is formed in the plate to permit free flexure of the bladder 51 and also to enable a visual determination as to whether leakage has occurred within the casing. If fluid should leak past the piston 30, it will reach the fluid storage section of the cavity 50 and if the leakage is sufficient to substantially shift the bladder, toward the left as viewed in FIG. 1, a part of the bladder will be seen at the opening 56 and suitable repair can be made to the unit. Additionally, the fluid storage section permits displacement of air during operation of the piston 30. The application of fluid pressure to the piston 30 can cause rapid movement of the piston and, unless there is provision for displacement of air within the unit, there can be an air ram effect created which could cause inadvertent upward movement of the plunger 12 and deflection of a relatively light material workpiece. This air ram effect is avoided because of the communication with the fluid storage section of the cavity. The bladder 51 renders the interior of the adjustable work support a closed system, so that there can be flow of oil and air to the fluid storage section and with the entire system being sealed against contamination which might occur if the system were open.

In use of the adjustable work support, the piston 30 is in retracted position under the urging of spring 35 and positioning of a workpiece on the plunger 12 causes the plunger to move to a predetermined position against the urging of the spring 20. Fluid pressure, such as from an oil pressure source, is directed through the passage 45 to the right-hand side of the piston, as seen in FIG. 1, which causes movement of the piston to the left and shift of the disc 40 to lock the plunger 12 in the predetermined position. Any tendency of air trapped behind the piston and in the lower part of the plunger bore 11 to create an air ram effect to move the plunger upwardly during operation of the piston 30 is avoided because of the communication with the fluid storage section of the cavity 50 through the passage 52. If an O-ring 60 surrounding the piston should leak, the leakage oil can reach the fluid storage section of the cavity 50 and, when the volume of leaked fluid substantially fills the section, the bladder 51 will move to a position against the concave circular plate 55 and a portion of the bladder will be visible through the opening 56 which indicates to a user of the unit that a leak condition exists and corrective steps can be taken.

We claim:

1. An adjustable work support comprising, a casing with a cylindrical bore having an open end and a closed end, a plunger movable lengthwise in said bore and having an end extended from the open end of the bore for work-supporting engagement, means urging the plunger outwardly of the bore, means defining a piston chamber extending transversely to and opening to said bore, a disc at an end of said piston chamber adjacent said bore and movable toward and away from said plunger, a fluid-operated piston in said chamber having a rod engageable with said disc whereby pressurization of said piston urges said disc into locking relation with said plunger to hold said plunger in a predetermined position, means urging said disc toward the closed end of said bore to take up clearance between said disc and piston chamber, a cavity in said casing opening to the surface of the casing, a flexible bladder mounted in said cavity for sealing said cavity and for movement to permit variation in the size of a fluid storage section of the cavity, a protective member locked to said casing and holding said bladder fixed to the casing, and passage means interconnecting said piston chamber and closed end of said bore with the fluid storage section of the cavity whereby, upon movement of either the piston of the plunger, fluid can flow between the piston chamber and closed end of the bore and said fluid storage section.

2. An adjustable work support comprising, a casing with a bore having an open end and a closed end, a plunger movable lengthwise in said bore and having an end extended from the open end of the bore for work-supporting engagement, means defining a piston chamber, a movable disc adjacent said bore and movable toward and away from said plunger, a fluid-operated piston in said chamber having a rod engageable with said disc whereby advance of said piston urges said disc into tight frictional engagement with said plunger to hold said plunger in a predetermined position, means urging said disc toward the closed end of said bore, a cavity in said casing, a flexible bladder mounted in said cavity for movement to permit variation in the size of a fluid storage section of the cavity, and passage means interconnecting said piston chamber and closed end of said bore with the fluid storage section of the cavity whereby, upon pressurization and advance of the piston, fluid can flow from the piston chamber and closed end of the bore to said fluid storage section.

3. An adjustable work support comprising, a casing with a cylindrical bore having an open end and a closed end, a plunger movable lengthwise in said bore and having an end extended from the open end of the bore for work-supporting engagement, means urging the plunger outwardly of the bore, means defining a piston chamber extending transversely to and opening to said bore, a disc at an end of said piston chamber adjacent said bore and movable toward and away from said plunger, a fluid-operated piston in said chamber having a rod engageable with said disc whereby pressurization of said piston urges said disc into locking relation with said plunger to hold said plunger in a predetermined position, and resilient means urging said disc toward the closed end of said bore to take up clearance between said disc and piston chamber.

4. An adjustable work support comprising, a casing with a bore having an open end and a closed end, a plunger movable lengthwise in said bore and having an end extended from the open end of the bore for work-supporting engagement, means urging the plunger outwardly of the bore, means defining a piston chamber extending transversely to and opening to said bore, means including a fluid-operated piston in said chamber for holding said plunger in a predetermined position, a cavity in said casing opening to the surface of the casing, a flexible bladder mounted in said cavity for sealing said cavity and for movement to permit variation in the size of a fluid storage section of the cavity, a protective member locked to said casing and holding said bladder fixed to the casing, and passage means interconnecting said piston chamber and closed end of said bore with the fluid storage section of the cavity whereby, upon pressurization and advance of the piston, fluid can flow from the piston chamber and closed end of the bore to said fluid storage section.

5. An adjustable work support comprising, a casing with a bore having an open end and a closed end, a plunger movable lengthwise in said bore and having an end extended from the open end of the bore for work-supporting engagement, means urging the plunger outwardly of the bore, means defining a piston chamber extending transversely to and opening to said bore, means including a fluid-operated piston in said chamber for holding said plunger in a predetermined position, a cavity in said casing, a flexible bladder mounted in said cavity for movement to permit variation in the size of a fluid storage section of the cavity, and passage means interconnecting said piston chamber and closed end of said bore with the fluid storage section of the cavity whereby fluid can flow between the piston chamber and closed end of the bore and said fluid storage section.

6. A work support as defined in claim 5 wherein a protective member secured to the casing holds the bladder in fixed relation to the casing, and an opening in said member into which a part of said bladder can move when fluid has leaked past said piston and filled said fluid storage section.

* * * * *